(12) United States Patent
Varady

(10) Patent No.: US 11,701,849 B2
(45) Date of Patent: Jul. 18, 2023

(54) SYSTEMS AND METHODS FOR MANUFACTURING EYEWEAR AND PROVIDING DOWNSTREAM INFORMATION TRANSFER

(71) Applicant: BESPOKE, INC. Inc., San Francisco, CA (US)

(72) Inventor: Eric J. Varady, San Francisco, CA (US)

(73) Assignee: BESPOKE, INC., San Francisco, CA (US)

( * ) Notice: Subject to any disclaimer, the term of this patent is extended or adjusted under 35 U.S.C. 154(b) by 474 days.

(21) Appl. No.: 16/781,621

(22) Filed: Feb. 4, 2020

(65) Prior Publication Data

US 2020/0246884 A1    Aug. 6, 2020

Related U.S. Application Data

(60) Provisional application No. 62/801,169, filed on Feb. 5, 2019.

(51) Int. Cl.
*B23C 3/12* (2006.01)
*B29D 12/02* (2006.01)

(52) U.S. Cl.
CPC ............... *B29D 12/02* (2013.01); *B23C 3/12* (2013.01); *Y10T 29/31* (2015.01); *Y10T 29/49* (2015.01)

(58) Field of Classification Search
CPC ....... B29D 12/02; B23C 3/12; B23C 2215/40; B23C 2265/08; B23C 3/34; Y10T 29/31; Y10T 29/49
See application file for complete search history.

(56) References Cited

U.S. PATENT DOCUMENTS

| | | | | |
|---|---|---|---|---|
| 2,985,556 A | * | 5/1961 | Rowland | B29C 48/21 351/159.73 |
| 3,288,666 A | * | 11/1966 | Dacey | G02C 5/008 428/206 |
| 4,443,074 A | * | 4/1984 | Giacomelli | G02C 5/00 351/178 |
| 5,331,355 A | * | 7/1994 | Frank | G02C 5/00 351/83 |
| 10,618,235 B2 | * | 4/2020 | Valmassoi | B29D 12/00 |
| 2017/0165933 A1 | * | 6/2017 | Valmassoi | B29D 12/00 |

* cited by examiner

*Primary Examiner* — Ryan J. Walters
(74) *Attorney, Agent, or Firm* — Bookoff McAndrews, PLLC

(57) ABSTRACT

Systems and methods are disclosed for machining an eyewear frame. One method includes receiving a coupon of material for making the eyewear frame, the frame comprising a perimeter, a front portion and a rear portion; cutting the coupon along the perimeter of the eyewear frame, the cut being from the rear portion of the frame to a predetermined depth from the front portion of the frame; and creating a plastic seam around the frame by further cutting the coupon from the front portion of the eyewear frame.

8 Claims, 14 Drawing Sheets

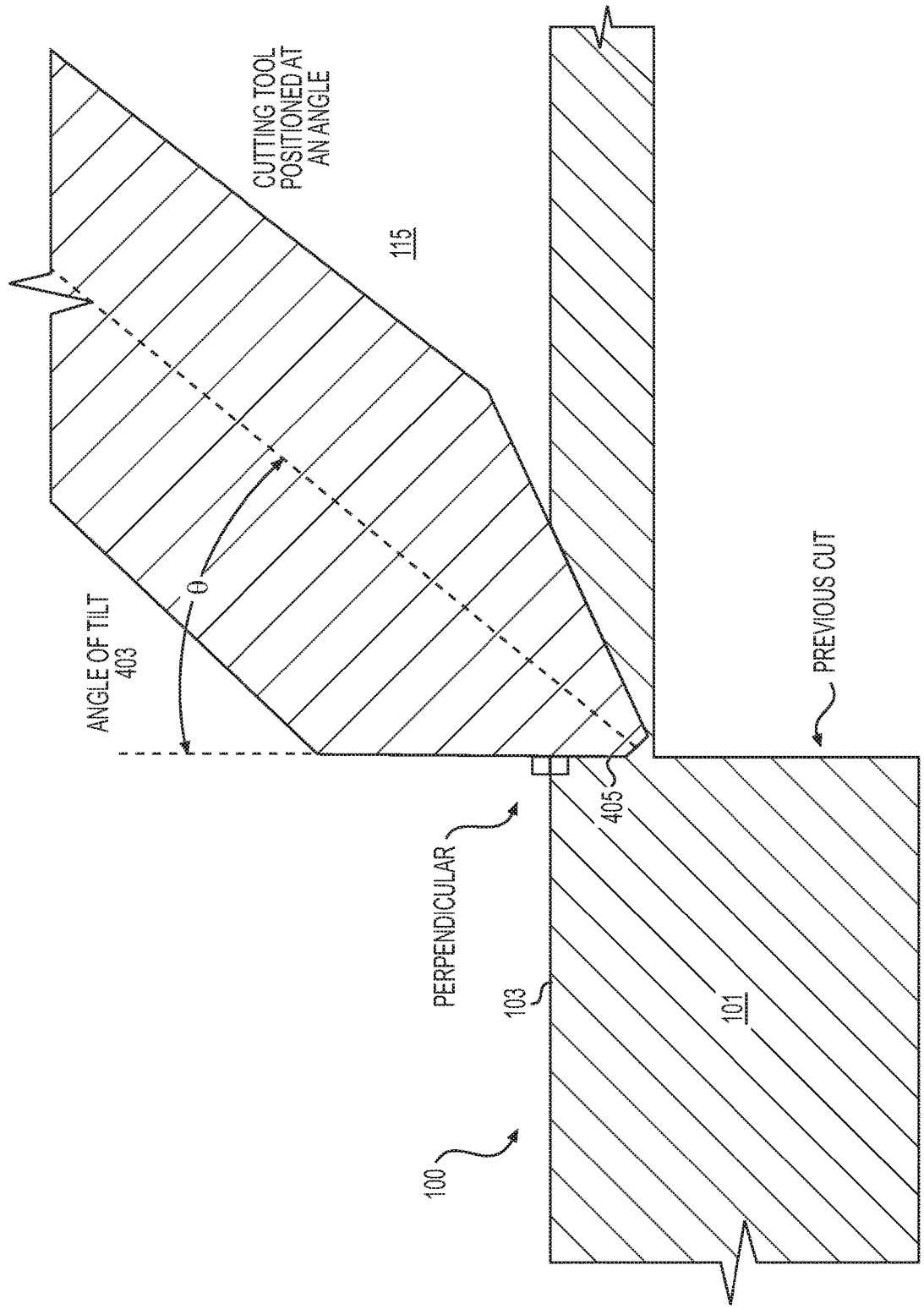

SYSTEMS AND METHODS FOR MANUFACTURING EYEWEAR AND PROVIDING DOWNSTREAM INFORMATION TRANSFER

RELATED APPLICATIONS

This application claims priority to U.S. Provisional Application No. 62/801,169 filed Feb. 5, 2019, the entire disclosure of which is hereby incorporated by reference in its entirety.

FIELD OF DISCLOSURE

Various embodiments of the present disclosure relate generally to manufacturing eyewear frames. In particular, systems and methods are disclosed for milling eyewear from coupons and using the coupons for downstream information transfer.

INTRODUCTION

There are currently two main methods for the subtractive milling of eyeglass and sunglass frames. The first method involves cutting a lens opening from a sheet of plastic, and transferring the plastic to a fixture with expanding features (e.g., pucks). The pucks expand, securing the plastic from the inside, and then the external features of the frame may be cut. One problem with this method is that it is only suited for mass-manufacturing of eyewear frames, where each frame is identical in shape. The expanding pucks are expensive and must be shaped for each design to be cut. Furthermore, the mechanisms for opening/closing of these pucks, and the material transport between cutting from the inside to cutting from the outside, are complicated and expensive.

A second method involves holding a plastic coupon from the outside, with the exception of tabs which keep the frame in place. However, this method may involve additional operations to remove these tabs. These operations may be costly in both time and labor, and they are hard to automate. Furthermore, it may be difficult to achieve a flush removal of the tab. Another exemplary problem with tabs is that they are not suited to be placed on surfaces that are curved or cut at a non-perpendicular angle to the front of the frame.

There is thus a compelling need to develop manufacturing methods that are cost effective and easy to automate, and that can be used for custom manufacturing any type of eyewear without the need for any hard tooling or design restrictions.

Lastly, the frame is traditionally removed from the coupon immediately after the tabs are cut. There is no current traceable aspect of resultant frames. This may make sense where all manufactured frames are identical, but traceability may be useful, especially if any customization is incorporated into the manufacturing. Accordingly, there is also a desire to develop manufacturing methods that enable traceability or other indications of subsequent process settings for parts, to facilitate manufacture of customized frames.

The foregoing general description and the following detailed description are exemplary and explanatory only and are not restrictive of the disclosure.

SUMMARY

One method includes: receiving a coupon of material for making an eyewear frame, the frame comprising a perimeter, a front portion and a rear portion; cutting the coupon along the perimeter of the eyewear frame, the cutting being from the rear portion of the frame to a predetermined depth from the front portion of the frame; and creating a plastic seam around the frame by further cutting the coupon from the front portion of the eyewear frame.

In accordance with another embodiment, a machining system for machining an eyewear frame, the system configured to perform a method comprising: receiving a coupon of material for making the eyewear frame, the frame comprising a perimeter, a front portion and a rear portion; cutting the coupon along the perimeter of the eyewear frame, the cut being from the rear portion of the frame to a predetermined depth from the front portion of the frame; and creating a plastic seam around the frame by further cutting the coupon from the front portion of the eyewear frame.

In accordance with another embodiment, a coupon of material comprising: a first cut along the perimeter of an eyewear frame, the cut being from a rear portion of the frame to a predetermined depth from a front portion of the frame; and a second cut along the perimeter of the eyewear frame, from the front portion of the frame, where the first cut and the second cut form a plastic seam in the coupon.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

FIG. 4 depicts a cross-section of the corner rounding cutting tool positioned at an angle relative to an eyewear frame, according to an embodiment of the present disclosure.

DESCRIPTION OF THE EMBODIMENTS

Figure 1A:
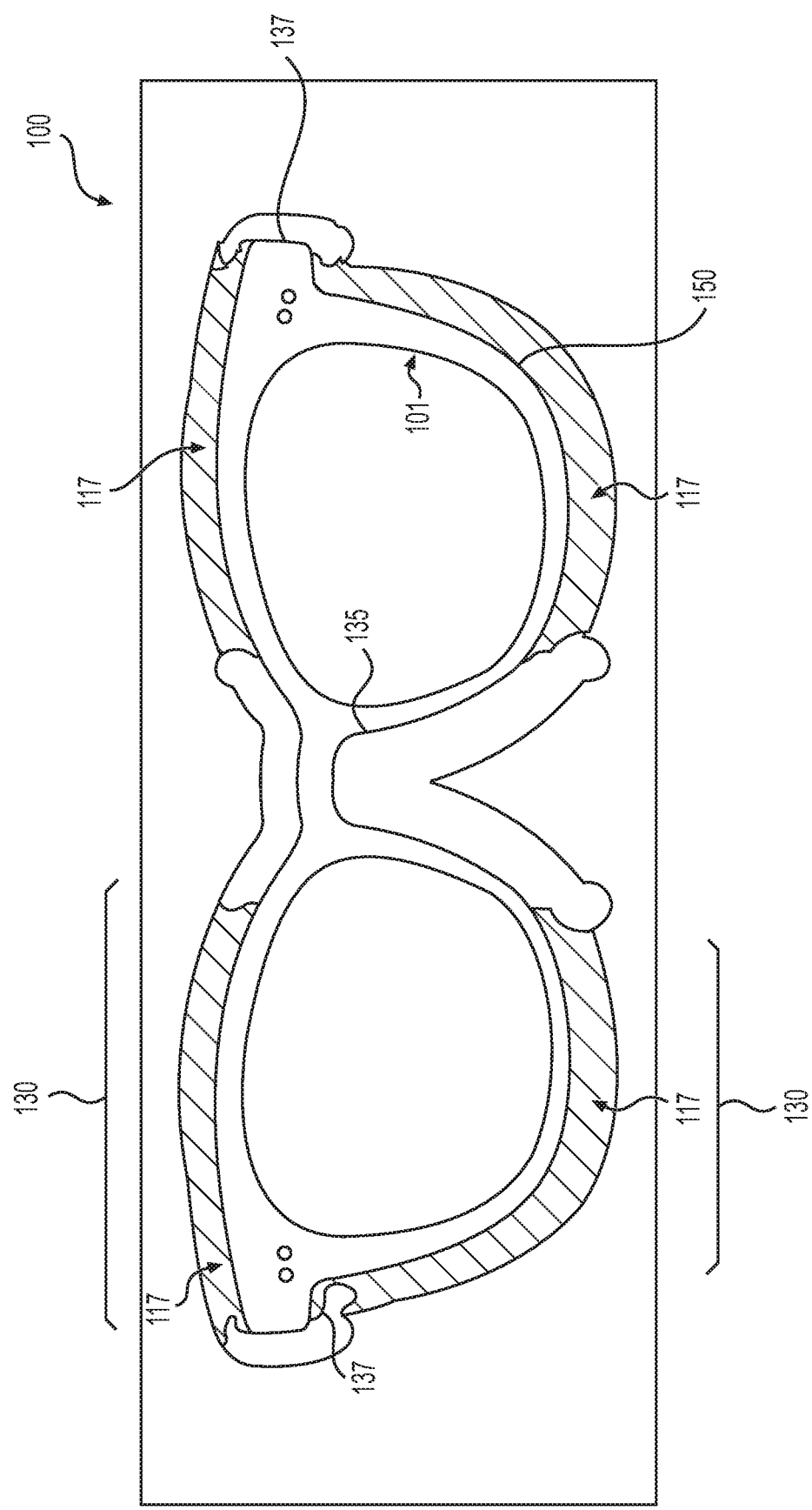
FIGS. 1A-1C depict various views an eyewear frame inside a coupon, according to an embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

As described above, two main methods currently exist for the subtractive milling of plastic eyewear. The first method involves securing a frame from inside the lens holes using expanding pucks. The cycle-time for this method is fast, and the frame may be held rigidly such that speeds and feeds can be optimized for a good resultant surface finish. However, this method is best suited for the mass-manufacturing of eyewear frames because the pucks are expensive and difficult to use, and need to be uniquely shaped for each frame design to be cut.

The second method involves holding the plastic coupon entirely from the outside, or perimeter of the coupon. The frame may be entirely cut in this held/suspended configuration, but to prevent the frame from falling through when it is cut completely, the frame may be tabbed in place. A tab may include a small section of plastic that is left uncut, connecting the frame to the outside of the plastic coupon from which the frame is cut. The advantage of holding the frame from the outside is that there is less material handling, and the cutting of a frame can be done without any hard tooling (e.g., the expandable puck described above). With this method, the entire 3D shape of a frame can be determined purely through 3, 4, and/or 5-axis milling operations.

However, one of the problems with the second method is that it involves one or two secondary operations to remove these tabs, for example, (1) the cutting of the tabs such that the frame is removed from the coupon, and (2) the removal of the remnant tab such that there exists little to no evidence of the tab on the frame. This removal may be done through a routing operation, and often followed by manual sanding. The secondary operations may be costly in both time and labor, and they may be hard to automate. Furthermore, it may be difficult to achieve a perfectly-flush removal of the tab. Even a half a thousandth of an inch of remaining tab is hard to remove via a tumbling operation, and if the tab removal cuts too deep, it is even more difficult to remove. Another exemplary problem with tabs is that they are not suited to be placed on surfaces that are curved or cut at a non-perpendicular angle to the front of the frame. When this is the case, a routing operation that uses a ball bearing to follow a surface to cut away a tab may not work because this tab may involve a 90° cut.

Thus, there is a compelling need to develop manufacturing methods that combine the advantages of holding the frame from the inside and holding the frame from the outside: a process that may involve no hard tooling, may be easy to automate, is suitable for custom manufacturing, has no design restrictions, and is cost-effective. A desire exists for a process that is high-quality and high-yield. The following embodiments provide the advantages of a fast cycle time and minimal material handling, while removing the expense and manufacturing issues involving needs for specialized pucks/fixtures and tab removal.

Further, existing methods provide no way of tracking or providing information on further manufacturing or assembling of frames, after the subtractive milling step. At the same time, the plastic coupon that a frame is made from is discarded immediately once the frame is formed. The following disclosure also provides methods of tracking parts formed from the milling step, by leveraging the plastic coupon. For example, the following embodiments describe indicators or markers that may be provided on a coupon or a carrier (e.g., a coupon with a frame cut into it that is not yet excised from the coupon). The indicators or markers may serve a valuable function of providing part traceability, conveying subsequent process settings, or providing tooling holes for alignment. The disclosed embodiments also enable customized hinge insertion and frame bridge bumping, e.g., in 2 axes.

Thus, embodiments of the present disclosure are directed to systems and methods for subtractively machining an eyewear frame from a coupon of material by securing the coupon by its perimeter. The material may comprise any material, including one or more of plastic, buffalo horn, wood, carbon fiber, aluminum, stainless, monel, titanium, metal alloys, etc.

In one embodiment, a coupon may be secured by its perimeter, and cuts can be made to generate a "tab" that extends along an entire perimeter of the frame, or at least one or more portions extending along substantial portions of, or substantially all of the perimeter of the frame. In other words, rather than creating tabs in, e.g., two discrete areas on either side of the frame and performing additional machining to remove the tabs, the embodiments of the present disclosure may involve subtractively milling/machining a plastic coupon to create breakable seam along all or a substantial portion of the perimeter of a frame from which the frame may be cut. Such a seam or tab can be of any arbitrary thickness; the thinner the seam or the tab, the less stiff the entire coupon may be during and after cutting, and the more vibration that can occur (resulting in slower cutting feeds and speeds in order to maintain an acceptable surface finish).

Figure 1B:
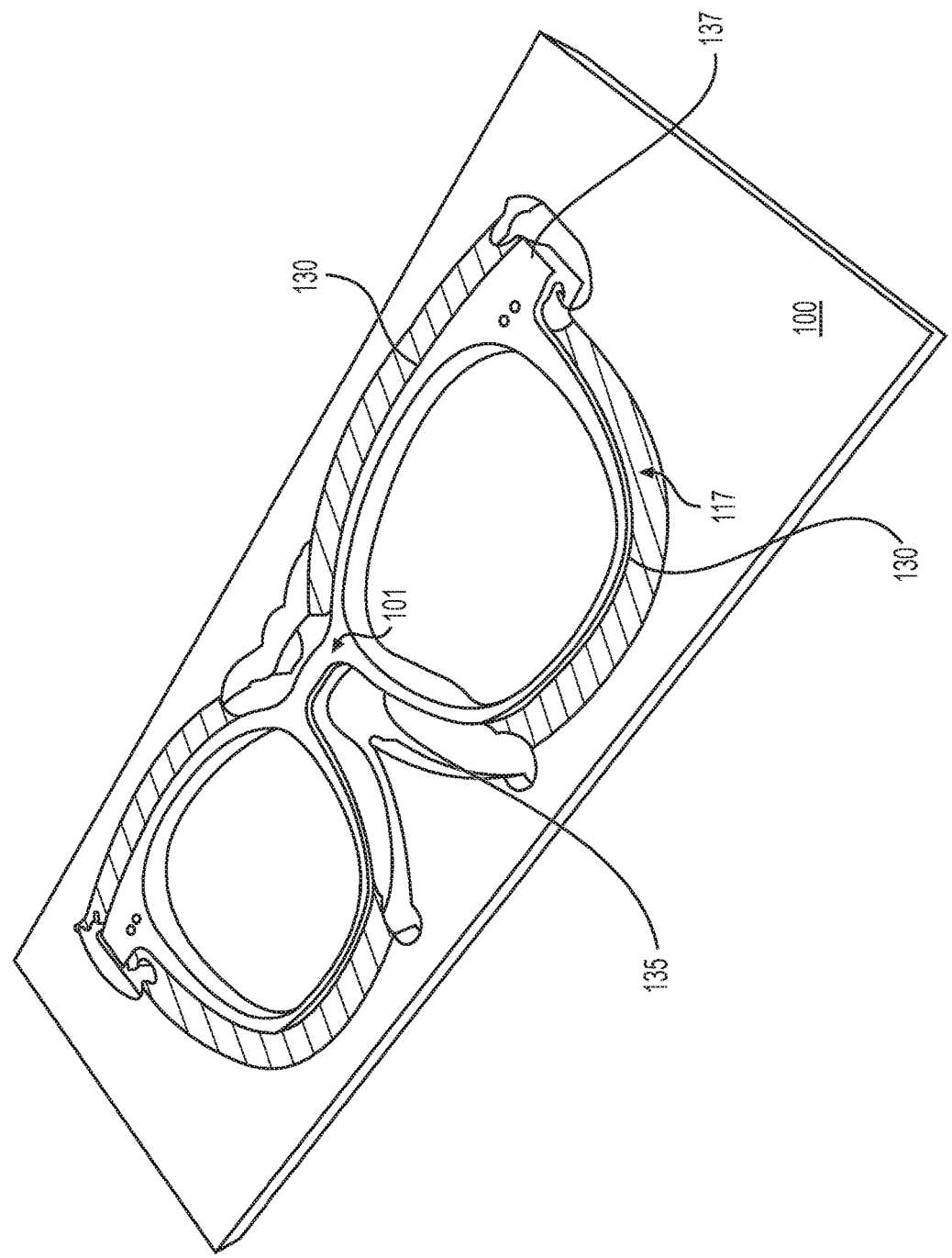
Figure 1C:
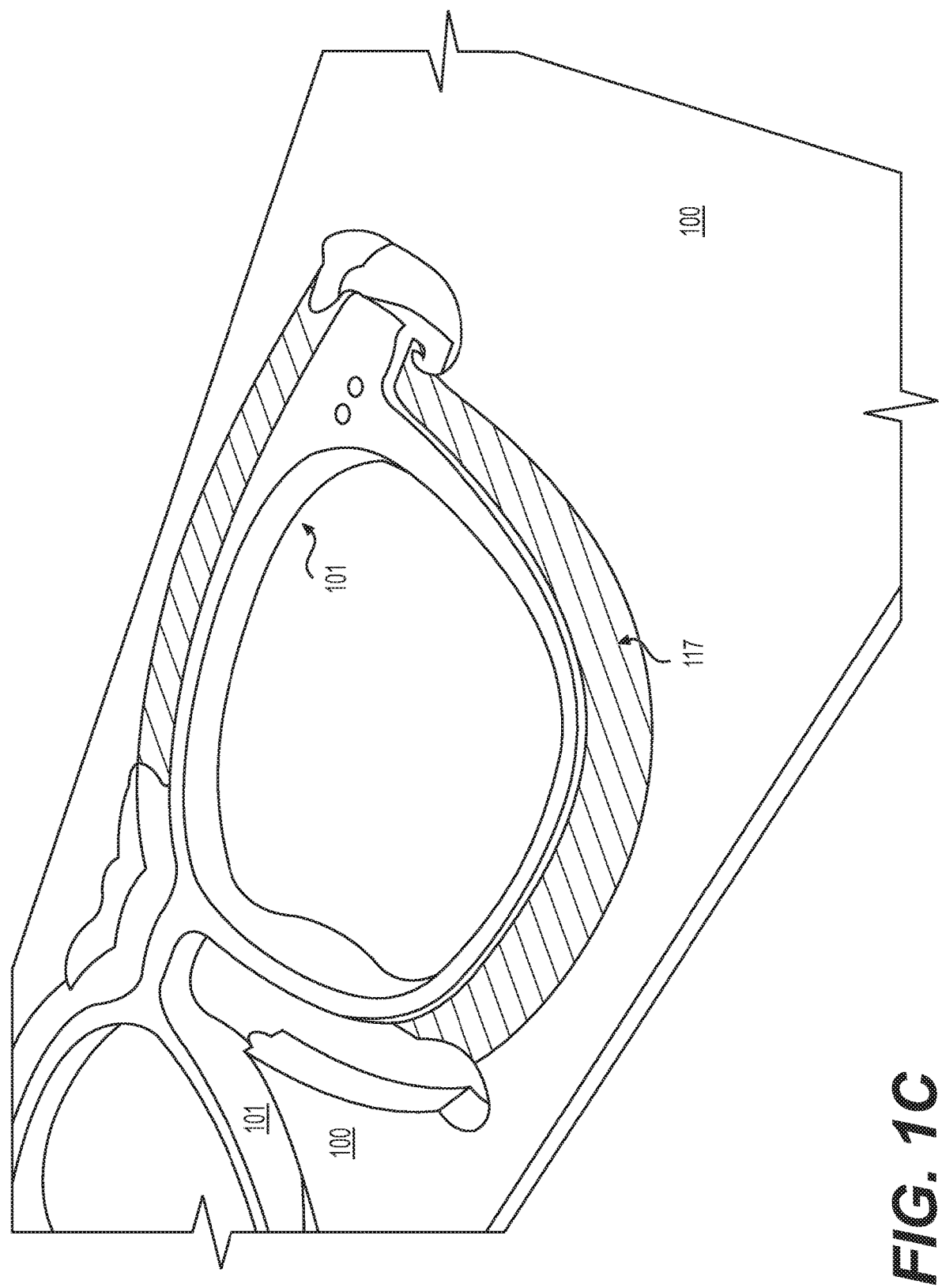
Figure 1D:
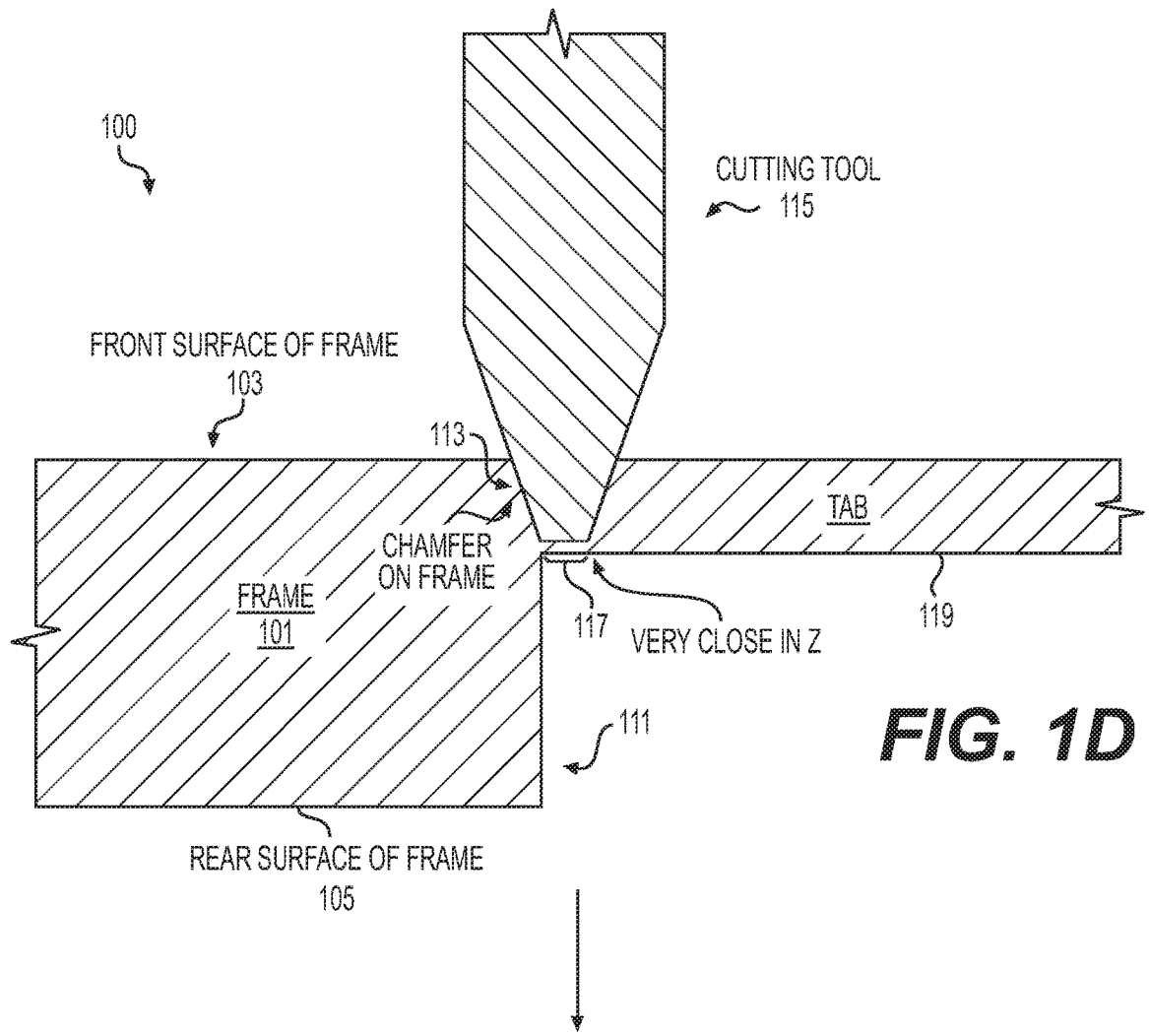
FIG. 1D depicts a cross-section of an eyewear frame and a cutting tool for cutting the eyewear frame from a coupon, according to an exemplary embodiment of the present disclosure.
Figure 1E:
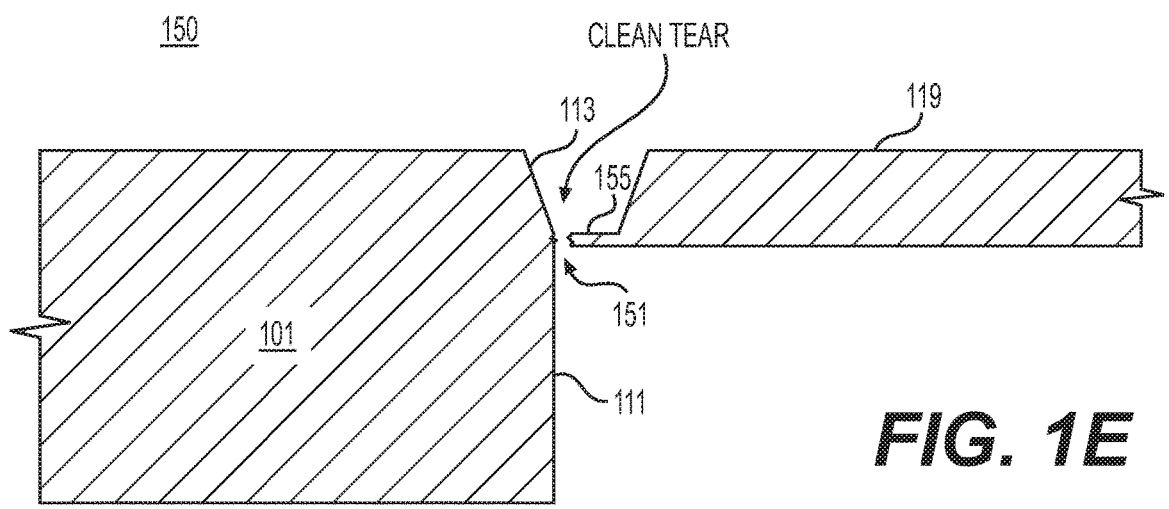
FIG. 1E depicts a cross-section of removal of the eyewear frame from the coupon, according to an exemplary embodiment of the present disclosure.

FIGS. 1A-1C depict various views of an eyewear frame and a coupon. FIGS. 1D-1F depict illustrations of an eyewear frame being cut from plastic coupon, for the machine method described in FIG. 2.

As shown in FIG. 1A, a frame 101 may be cut from a plastic coupon 100. Coupon 100 may comprise a plastic coupon, or a coupon made of buffalo horn, wood, carbon fiber, aluminum, stainless, monel, titanium, metal alloys, or a combination thereof, etc. The coupon 100 may be approximately 70×180 mm, though other dimensions may be used, based on the style of frame being manufactured. For example, small frames may be cut from a larger coupon, though this could generate more waste. A temple arm may be cut from any coupon size that is wide and long enough to hold the shape of the arm or arms to be cut, including the width of cutting tools on all sides. The hinge and/or wire core for a temple arm may be inserted prior to the cutting/shaping operation described in method 200 below. The coupon may be held from two or more sides by clamping from the top and bottom (or compressing from the sides) with a minimum area of the coupon rendered unable to be cut due to clamping. The coupon of material may comprise a marker, the marker comprising one or more of the following: a serial number, part number, unique identifier, bar code, text, downstream machine settings, a hole, a feature to aid machining, or a hinge marker. A hinge on the eyewear frame may be inserted based on the plastic coupon, the serial number, the part number, the unique identifier, the downstream machine settings, the hole, the feature to aid machining, the hinge marker, or combination thereof, as described in later embodiments below.

A seam 117 may extend between the plastic coupon 100 and the frame 101. The seam 117 may be broken to separate the frame 101 from the coupon 100. In some embodiments, the seam 117 may be broken by hand. In such cases, the seam 117 may be machined to be thick enough to keep the frame 101 contained in the coupon 100, yet thin enough to be broken by hand and provide a clean broken edge where the frame 101 is separated from the coupon 100. Seam 117 may extend around all or substantial portions of the perimeter of the frame 101. While FIGS. 1A-1C depict seam 117 as a series of disconnected seams extending partially around the perimeter of frame 101, seam 117 may also exist as one continuous seam around the entire perimeter of frame 101, or a seam extending only along a portion of frame 101. For example, a seam 117 may extend along, say, 50%, 80%, 90% or 100% of a frame perimeter.

In some cases, the seam 117 may extend along a length of the perimeter of frame 101, depending on the shape of frame 101. For example, seam 117 may be taken as extending along approximately 80% of the perimeter of frame 101 in front view FIG. 1A and perspective view FIG. 1B. In some cases, seam 117 may be designed to extend across lengths 130 of a frame 101 that are devoid of acute or sharp edges, angles, or design features, e.g., nosepiece 135 or side hinge 137. FIG. 1C is an example of a seam that may extend along less than half of a frame perimeter. This may facilitate removal of a frame 101 from a plastic coupon 100.

Figure 2:
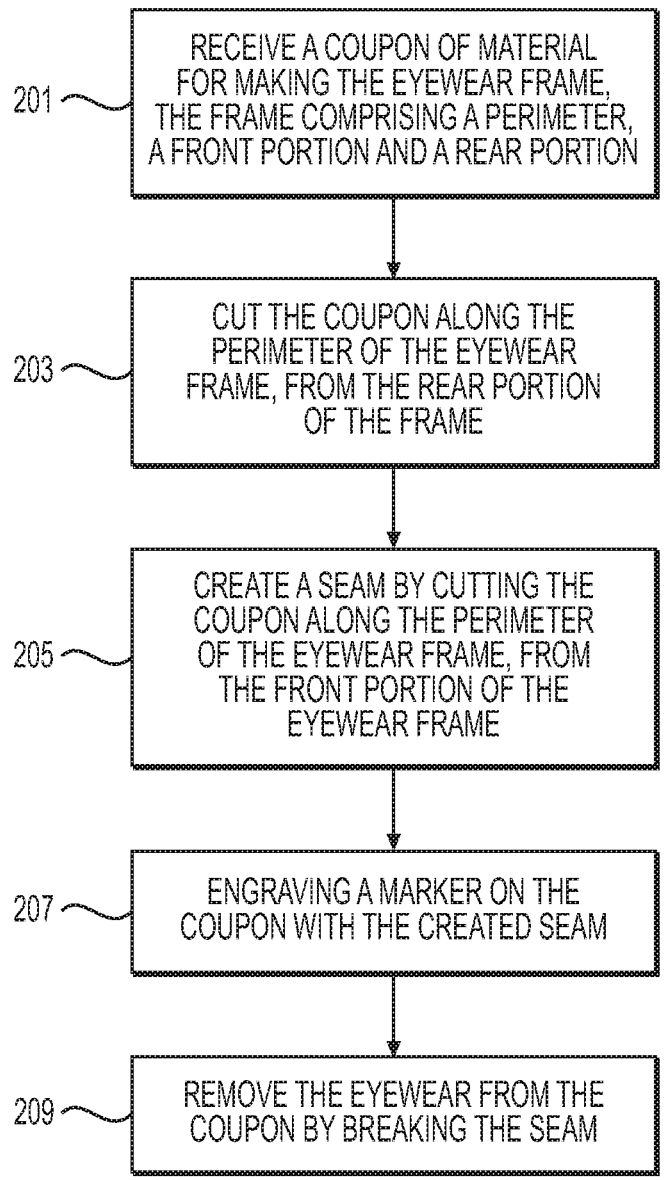
FIG. 2 depicts a flowchart of an exemplary method of machining an eyewear frame and removing the eyewear frame from the coupon, according to an embodiment of the present disclosure.
Figure 3A:
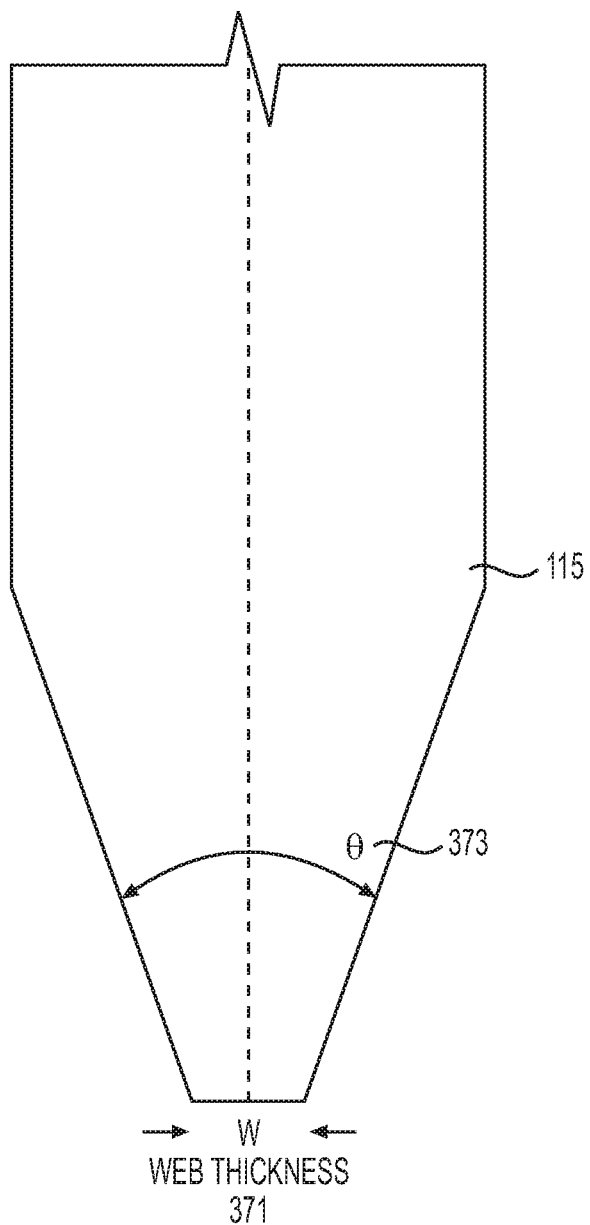
FIG. 3A depicts a cross-section of the cutting tool for creating a seam for excising the frame from the coupon, according to an exemplary embodiment of the present disclosure.
Figure 3B:
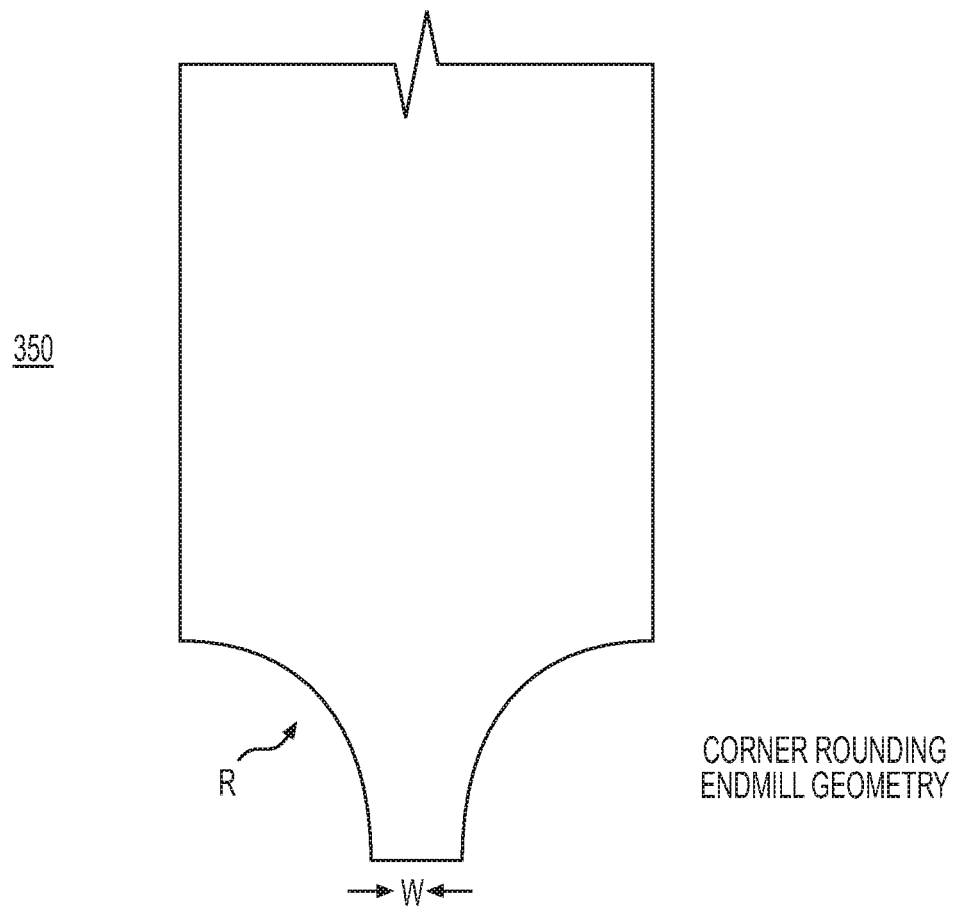
FIG. 3B depicts a cross-section of a corner rounding cutting tool, according to an embodiment of the present disclosure.

FIG. 1D shows a process of cutting a frame into a plastic coupon, and FIG. 1E shows a removal of frame 101 from plastic coupon 100. FIG. 2 includes a method 200 of creating a removing a frame from a coupon. FIGS. 3A and 3B then discuss the cutting tools that may be used to cut a frame from the coupon.

As depicted by FIG. 1D, a cutting tool 115 may be used to cut a frame 101 out of the plastic coupon 100. In one embodiment, the cutting tool 115 may cut the frame 101 out of coupon 100 in a way that forms a seam 117 extending around all or substantial portions of the perimeter of the frame 101, so as to create a tab 119 likewise extending around all or substantial portions of the perimeter of the frame 101.

In the embodiments shown by FIGS. 1D and 1E, the plastic coupon 100 may comprise a front surface 103 and a rear surface 105. In one embodiment, to create seam 117, a first cut 111 may be made from the rear surface 105 and then a second cut 113 may be made from the front surface 103. It should be appreciated that while first cut 111 and second cut 113 may actually be made in any particular order or sequence. In some instances, the cut 113 into the front surface 103 of frame 101 may be made by a cutting tool 115, while cut 111 into the rear surface 105 of frame 101 may be made using the same cutting tool 115 or a different cutting tool or even a different type of material removal. The cuts 111 and 113 may form a tab 119, of any depth or size, extending around all or substantially all of the perimeter of the eyewear frame 101. The tab 119 may aid in breaking the frame 101 from the coupon 100, at a breaking surface 151, as shown at diagram 150 of FIG. 1B.

As seen at FIG. 1E, the tab 119 may include a flange 155 of the seam 117, which may allow for a clean break between the frame 101 and coupon 100 at breaking surface 151. The seam 117 may allow the frame 101 to be separated from the coupon easily, even by hand. As shown in FIG. 1E, the frame 101 may be separated from tab 119 by a "tear" or "rip" at the seam 117, leaving a clean perimeter edge (e.g., breaking surface 151) behind, while also providing a front-chamfer (e.g., cut 113) to the front of the frame. In one exemplary case, the thickness of the seam 117 may be between 0.002 mm and 0.08 mm, in order to achieve appropriate stiffness during cutting, prevent "accidental excise" (where a cutting tool inadvertently penetrates through the seam 117 and inadvertently excises the frame), and yet still provide a clean manual excise.

FIG. 2 depicts a flowchart of a method 200 of milling an eyewear frame from a plastic coupon, according to an embodiment of the present disclosure. The steps of method 200 may be performed in any order. Step 201 may include receiving a coupon (e.g., coupon 100) of material from which an eyewear frame is to be machined. The frame may comprise a perimeter, a front surface (e.g., front surface 103), and a rear surface (e.g., rear surface 105). Step 203 may include cutting the coupon along the perimeter of the eyewear from the rear portion of the frame, as shown by cut 111 of FIG. 1A. Further, the cut may be from the rear portion of the frame to a predetermined depth from the front portion of the frame. FIG. 1A illustrates this instance, in which cut 111 extends from the rear surface 105 of the frame 101 to a predetermined distance (e.g., "Z" depth) from the front surface 103 of the frame 101.

Step 205 may include creating a plastic seam around the frame by further cutting the coupon from the front portion of the eyewear frame. In other words, step 204 may include cutting opposite the cut made from the rear surface of the frame to the predetermined depth from the front of the frame. For example, the frame may be flipped over and cut. In an instance involving a 3-axis machine, the frame may be manually turned over and relocated in the machine. In instances using a 4-axis or 5-axis machine, the machine may turn the frame over for an additional cut, either as part of a cutting program, or as an automated step of method 200.

Exemplary step 205 may include cutting an "excise pass" (e.g., cut 113 of FIG. 1A) from the front surface 103 of the frame 101, using an engraving or chamfering tool (e.g., tool 115 of FIGS. 1A and 3A). In one instance, the excise pass may be set to cut at a Z (e.g., depth) value that is close to the Z (e.g., depth) value of the perimeter cut on the opposite side. For example, as seen from FIG. 1D, cut 113 may be set close to cut 111. This may be so that there is only a very thin amount of plastic remaining (e.g., at seam 117 of FIG. 1D). It should be appreciated that while the present disclosure describes performing a first cut 111 from a rear surface 105 followed by a second "excise cut" 113 from a front surface 103, the first and second cuts may be made alternatively on either the front or rear sides, and in any desired order or sequence.

In some cases, step 205 may include creating a chamfer (or any type of edge) along a perimeter of the front portion of the frame. The chamfer may be created by cutting the coupon from the front portion of the frame, at an offset from the perimeter of the eyewear frame. For example, an engraving or chamfering tool may be offset outwards from the perimeter of the frame, to cut the frame from the coupon. In some cases, the offset may be set at a distance outwards from the perimeter of the frame. In an exemplary scenario, the distance outwards from the perimeter of the frame may be a distance equal to half the web thickness of the tool (e.g., as shown by web thickness 171 of the cutting tool 115 at FIGS. 3A and 3B). The included angle of the cutting tool can be any arbitrary angle, but a 90° "V" shape (e.g., 45° on each side) may be one example of an angle of the cutting tool. The web thickness of a tool may be the width (e.g., diameter) of the bottom of the cutting tool that is flat, e.g., as shown by FIGS. 1D, 3A, and 3B. In some embodiments, the cutting tool may include a slight helical angle (e.g., a slight upward spiral) to minimize heat buildup, unwanted vibration, or self-excise of the frame from the coupon.

The more acute the cutting tool or the smaller the web thickness (e.g., flat width) of the tool, the weaker the tool and the slower step 205 may be performed. Since the radius of the tool at the cutting area may be small, a higher rotation per minute (RPM) of the spindle, may improve the finish of the cut and frame, the speed of the feed, and the longevity of the tool. Chip evacuation may be used during step 205 to monitor heat buildup, vibration, and the structural integrity of the seam. Such monitoring may mitigate or prevent heat buildup, unwanted vibration, or self-excise. In some embodiments, the cutting tool may include a slight helical angle (e.g., a slight upward spiral) to minimize heat buildup, unwanted vibration, or self-excise of the frame from the coupon.

A chamfer on the frame (e.g., from cut 113, as shown by FIGS. 1D and 1E) may form a rounded surface that may be part of a radius of the frame during subsequent post-processing (e.g., tumbling). If a chamfer is not desired, a cutting tool with an acute cutting geometry (e.g., cutting tool 115 of FIG. 3A) may approximate a vertical cut. In embodiments where a rounded edge is desired directly from the cutting machine, a corner-rounding end mill can be used for step 205. An exemplary corner-rounding end mill is shown by FIG. 3B.

Figure 5:
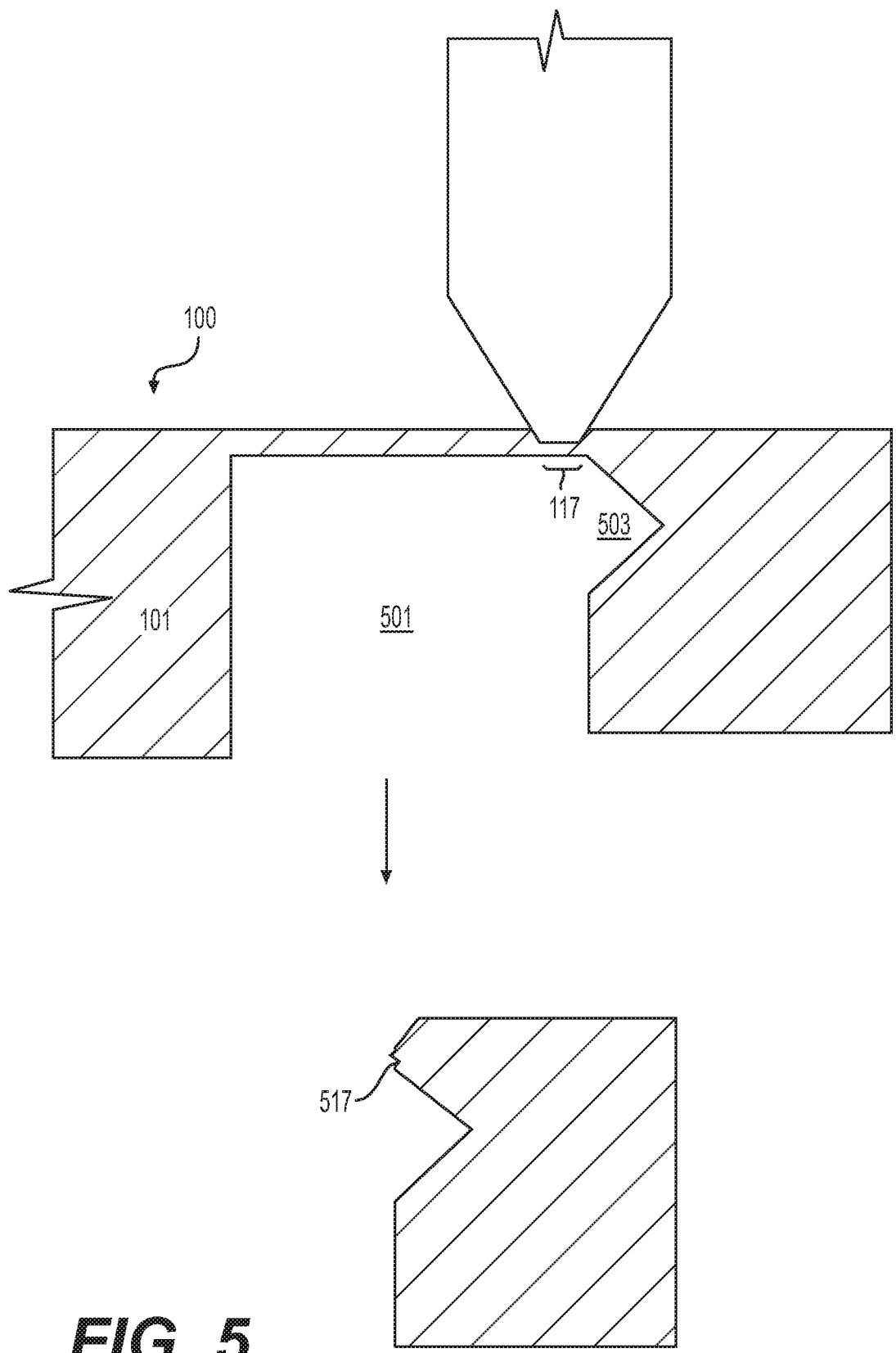
FIG. 5 depicts a cross-section of the cutting tool cutting an eyewear frame from a coupon, where the frame includes a lens cutout, according to an embodiment of the present disclosure.
Figure 6:
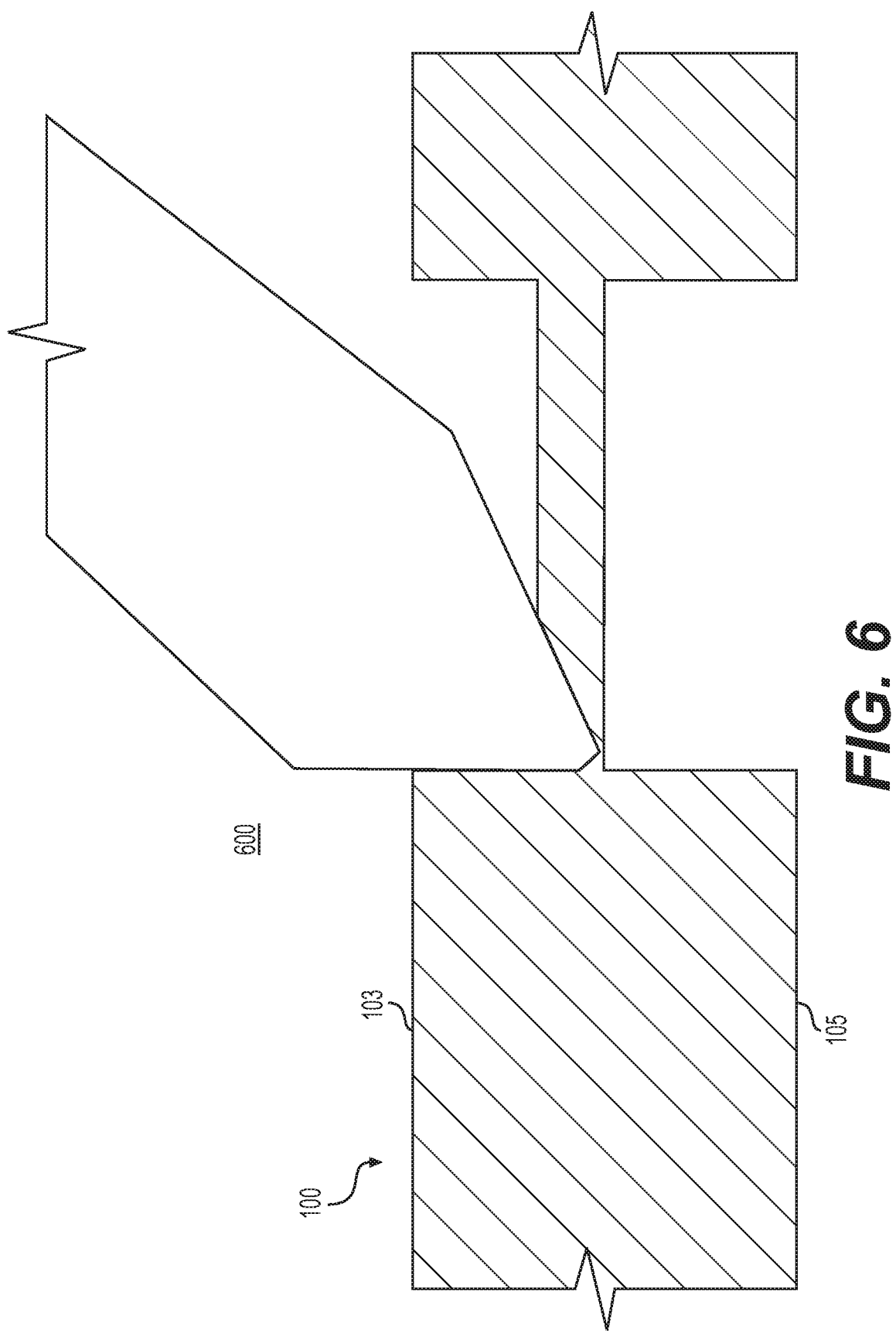
FIG. 6 depicts a cross-section of the cutting tool cutting an eyewear frame where a seam is spaced from a front portion of a frame, according to an embodiment of the present disclosure.

Another way of performing step 205 may include angling the tool 115 or coupon 100 during cutting such that the resultant cut is vertical and/or parallel to a side wall of the frame (even if the side wall is not vertical), e.g., as shown by FIG. 4. For example, FIG. 4 shows a cutting tool 115 at an angle of tilt 403 from the coupon 100. The resultant wall 405 may be perpendicular to a front surface 103 of the frame 101. This case may be used, for instance, in a 4-axis and 5-axis machining environment. For embodiments where there may be a desire to save material from inside a lens cutout, the angled cut technique of FIG. 4 may be applied to lens cutouts of a frame, as shown by FIG. 5. FIG. 5 illustrates an embodiment having lens cutouts 501 and grooving 503 applied to a frame 101. (A desire to save material may arise from a desire to use the material for other purposes or processes. For example, material may be recovered and used as a glued or welded on block in another frame to build up thickness in a particular region. Another use for recovered material may be for making matching accessories, e.g., cufflinks, earrings, etc.) The seam may also be maintained, and the lens cutout area used as a tooling hole location, or as a location for traceability (e.g., engraved with human-readable serial number, barcode), or engraved/marked with downstream processing instructions. Exemplary processing instructions may include angle(s) to set a hinge insertion machine to, or which hinge to use, etc.

Figure 7:
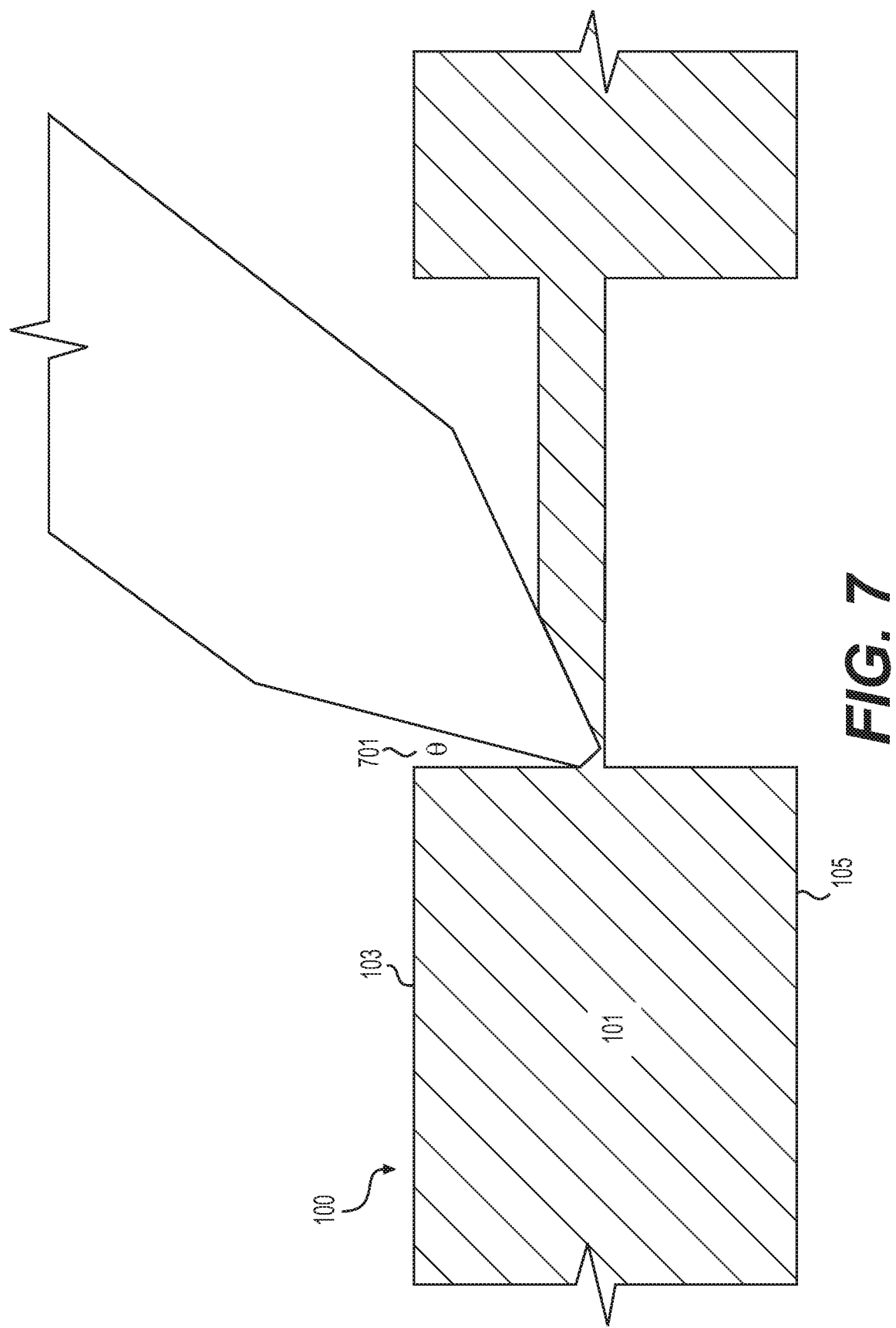
FIG. 7 depicts a cross-section of the cutting tool cutting at an offset angle, according to an embodiment of the present disclosure.

Some embodiments of step 205 may include a creating a seam located flush with the front surface of the frame. Other embodiments of step 205 may include creating a seam spaced from the front surface of the frame, as shown by FIGS. 1D, 3B, 4, 5, and 6. In these figures, the seam may be an arbitrary distance (e.g., depth "Z") from the front surface of the frame (e.g., surface 103). This location of the seam may allow for a sharp front edge or for a large radius feature for the design of the frame. Frame designs with front edge designs or radius features may be included, for instance, on the outer edges of certain feminine designs. To create a seam that is spaced from the front portion of the frame, a 4th or 5th axis coordinate system may be used to cut the seam, as shown by diagram 600 of FIG. 6. Some embodiments may also include cutting at an offset angle (e.g., angle 701 of FIG. 7). This offset angle may mitigate contact with any previously-cut sidewalls of the frame or reduce inadvertent introduction of chatter during the cutting process.

Step 207 may include applying a feature to the coupon, e.g., engraving a marker on the coupon. In embodiments where step 207 is performed after a seam is created, the engraving or marker may be made on the coupon with the created seam (e.g., a "carrier"). For example, step 207 may include applying a serial number to a coupon (e.g., coupon 100). In some embodiments, this serial number can be read or scanned and associated with the part to be cut before or after cutting, thus shortening cycle-time. Alternatively, step 207 may include engraving a serial number on a carrier, where a carrier may comprise a coupon with a frame and seam cut completed. These serial number(s) may be applied to raw plastic via stamping, printing, engraving, laser marking, labeling, or other known process in eyeglass manufacturing or other industry. Step 207 may also include applying a traceable element to a coupon or carrier (e.g., prior to cutting or after cutting), via read-only or read/write NFC tags. In some embodiments, such traceable element(s) may be too large to fit on a typical eyeglass frame, but may be applied to the (larger) coupon or carrier. This traceable feature and/or serial number, engraving, or marker may be associated with a frame, through cutting of the seam (e.g., while the frame is not yet excised from the coupon/carrier). Traceable feature(s), serial numbers, engravings, or markers, etc. may be transferred/applied directly to a frame as well, via the known manufacturing/industry techniques previously described.

The marker on the coupon/carrier may also include a tooling feature. For example, step 207 may include drilling one or more tooling holes in a coupon or carrier, or having other features machined into a coupon/carrier. Such features may also facilitate downstream location and processing. These holes or features may be positioned relative to features of a frame or frame part (e.g., a temple arm) cut in the carrier. For example, the holes/features may be in a different location, for each frame shape or design cut into the carrier. For Instance, step 207 may include drilling holes to serve as location indicators for a portion of a frame under a bridge bump fixture. For example, the holes' vertical placement relative to the frame may determine the width of a bump to be imparted to the frame. The holes or location indicators may also dictate a width of a bump of a frame. For example, the shape of a bridge bump of an eyeglass frame may be formed by aligning a hole/location indicator of a frame, carrier, or coupon with an indicator on a bridge bump ram. Because a bridge bump ram may be tapered, the higher up the frame is located/aligned on a bridge bump fixture, the wider the bump imparted.

Alternately or in addition, the machined features may be used to locate the frame or frame part on a hinge-insertion machine such that the hinge is aligned with the area of the frame/frame part in which the hinge is to be inserted. Further, in addition to adjusting the tooling holes to allow a hinge insertion machine to position a hinge to be aligned to the frame, 5-axis machining techniques may be used to machine the area in the frame where a hinge may be inserted (e.g., side hinge 137 of FIG. 1A). For example, a flat plane of a cut frame or temple arm may be perpendicular to a hinge that is to be inserted. Furthermore, a pocket that a hinge may be inserted into may also be machined to be perpendicular (or orthogonal) to a 5-axis hinge insertion vector. This may mean that, regardless of the pitch/yaw angle of the hinge insertion direction, the same amount of material has been removed by machining. This may ensure process consistency across all insertion angles. Such machining techniques may further include calculating an amount of material that may be displaced by an inserted hinge, and removing, from the coupon, the calculated amount of material for the hinge. Such a process may ensure that voids or bulging does not occur from the inserted hinge. The above hinge insertion techniques may be applied to heat-insertion hinges and rivet hinges. Any tooling holes that could allow automated rivet placement and insertion may be used.

Step 209 may include removing the eyewear frame from the coupon by breaking the plastic seam. For example, step 209 may include manually or mechanically forming the breaking surface 151 by detaching the frame 101 from the tab 119 at seam 117. This is shown by FIG. 1E and FIG. 5. As shown by FIG. 1E, frame 101 may be detached from tab 119 at seam 117. Breaking surface 151 may be the edge formed where tab 119 is severed from frame 101. Similarly at FIG. 5 showing a grooved frame, breaking surface 517 may be formed where seam 117 is broken.

In some embodiments, step 209 of detaching the frame from the coupon may be performed immediately after a seam is formed. In other embodiments, the frame may be kept in the coupon. The coupon may be referred to as a "carrier" once the seam is made. The carrier and the frame may be attached by the seam. This carrier (or the original coupon) may have a functional purpose. For example, as previously described for step 207, an engraving or marking may be made on the coupon or the carrier. In this way, the coupon or carrier may convey traceability or subsequent process settings, or provide tooling holes for alignment. Additional exemplary engravings/markings may include laser engravings, dot pen markings, microscopic barcodes, or other marking method. These markings may be smaller than the usual serial number/bar code engravings, and used for smaller frame parts, e.g., a metal hinge.

Figure 8:
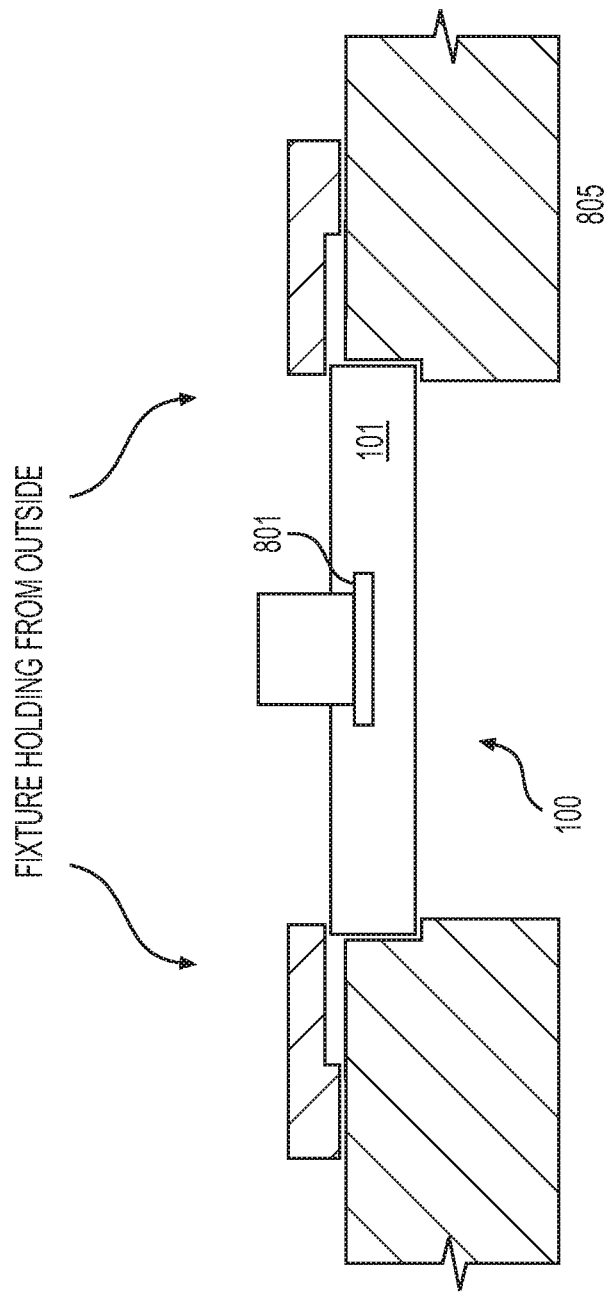
FIG. 8 depicts a cross-section of the cutting tool cutting a temple arm from a coupon, according to an embodiment of the present disclosure.
Figure 10:
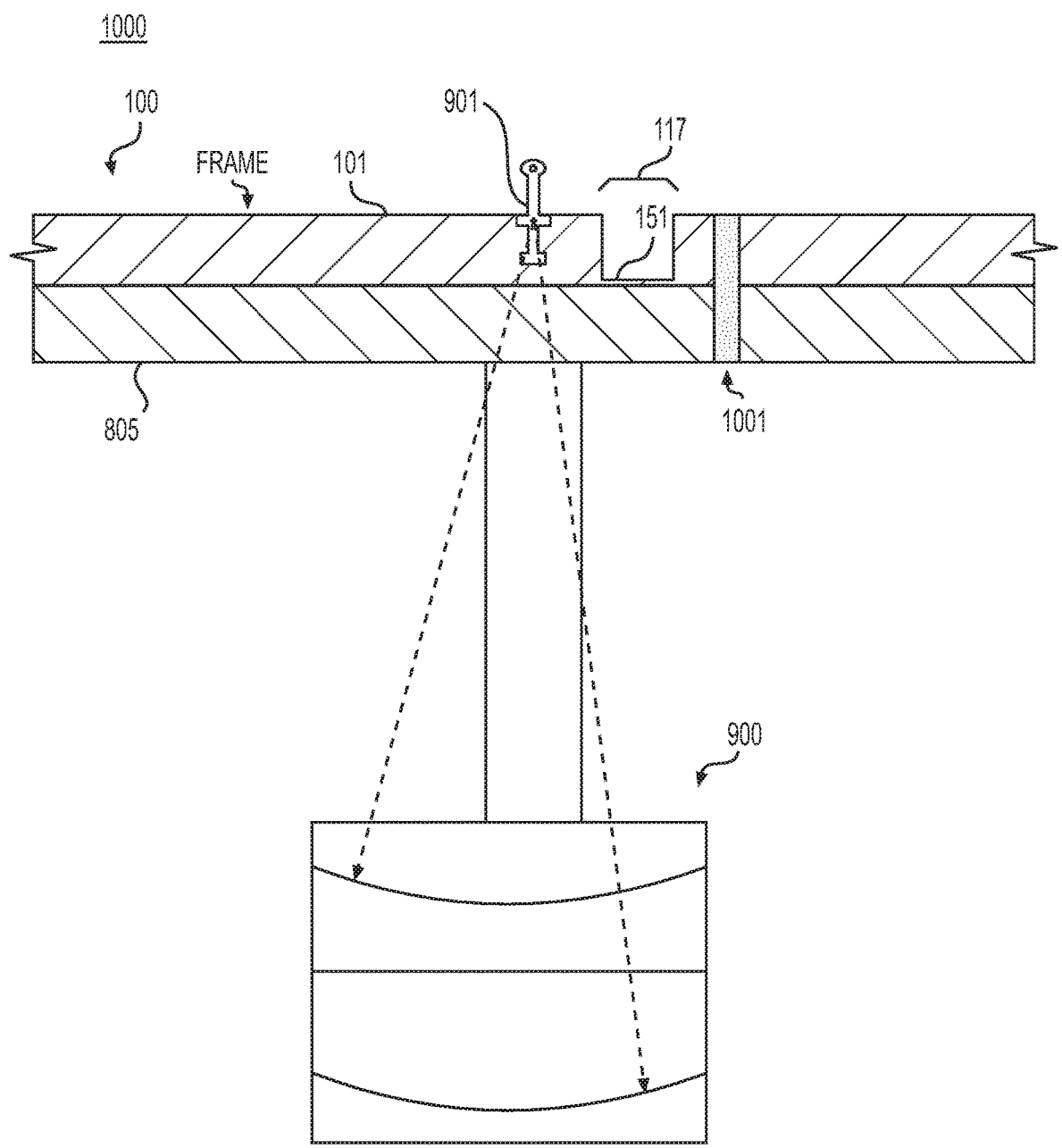
FIG. 10 depicts a cross-section of the goniometer inserting a hinge, according to an embodiment of the present disclosure.

The previously described embodiments and the method 200 may also include or be applied to the cutting of temple arms. For example, as shown by FIG. 8, a coupon 100 may comprise a temple arm coupon having a pre-inserted wire core 801. The wire core 801 may be may be inserted into the coupon 100 before or after CNC cutting. In some embodiments, the coupon 100 may be held in fixtures 805 from its perimeter. The fixtures 805 may comprise two or more opposite surfaces securing the coupon 100. A 2D or 3D shape of the temple may be cut, and then subsequently excised (e.g., using steps 203, 205, and 209 of method 200). Information can be imparted to the temple coupon so as to not lose traceability during downstream processes, as well as to impart settings for downstream processes (e.g., as in step 207 of method 200). For example, a serial number or customer name may be engraved on the temple coupon, the metal wire core may be marked (e.g., via laser marking) with a unique barcode (or human readable text) containing serial number or customer name. In some cases, the temple may then be manually excised from the carrier and the carrier may be discarded. Tooling holes (e.g., holes 1001 of FIG. 10) or other indexing, machining, processing, or post-processing machined features may be drilled/machined into a coupon or carrier, their location(s) relative to features of the temple design to be cut, in order to align downstream processes, such as the insertion of a decorative item, or the welding of a decorative tip.

Keeping a frame in a carrier (e.g., not immediately excising it post-CNC (computer numerical control) cutting) may have downstream advantages. In one embodiment, the carrier may transfer information to downstream operations, for example, if the carrier is engraved with a text or barcode (e.g., markings that may be 1D, 2D, etc.). For example, as described in step 207 a serial number, part number, unique identifier, or downstream machine settings (such as angles for hinge insertion) can be engraved on the carrier in human-readable (alpha-numeric text) or computer-readable (e.g. barcode) formats. Downstream operations may include machine instructions, or any type of instruction, e.g., instructions on which hinges to attach to a frame, which hardware to use and in what order to construct a frame, what color to use for a frame, etc.

Whether manufacturing stock or customized (e.g., one-off) eyewear frames, it may be important to maintain traceability throughout the manufacturing process. For example, method 200 may further include engraving or marking frame parts that may not be part of the coupon/carrier. For instance, method 200 may include marking a metal hinge or other part. In some cases, metal hinges may be engraved via laser engraving or dot pens, which may be smaller than an engraving/marking on a coupon or carrier. In one embodiment, the metal hinge may be inserted into a frame after the frame is cut and excised. In this embodiment, there may be a short duration in which traceability can be lost. Another embodiment may include engraving a unique serial number on the carrier while the frame is cut, and inserting/marking the hinge, while the frame is in the carrier (pre-excise). In other words, a hinge can be marked prior to insertion into a frame, or after insertion into a frame. If the hinge is marked before insertion, it can have the same serial number as the frame, or a different serial number that is then read and associated in a database with the serial number of the frame as engraved on the carrier. Once the hinge is marked and inserted, traceable with the frame, and the carrier may be discarded.

The present embodiments may also facilitate alignment for hinge/frame insertion, without needing dedicated tooling. For example, the downstream manufacturing process of hinge insertion may benefit from holding a frame or temple arm in a carrier that may have holes or markings to facilitate the hinge insertion. As context, different frame designs may call for hinges with different amounts of splay, drop, and rotation angle of the hinge relative to the front of a frame. Furthermore, different sizes of frames may call for different (X and Y) locations of the hinge. Machine setup of a traditional hinge inserter may be a laborious process that requires a lot of trial and error to dial in the precise alignment for frame insertion. Traditional hinge insertion may also require dedicated tooling to hold excised frames. In the present embodiment, hinge insertion may be performed on a frame while it is still in its carrier (pre-excise). Tooling holes may be drilled relative to intended hinge location(s), so the offset between the hinge and the holes may be fixed. The spacing and alignment of the holes relative to the hinge may also be fixed. Furthermore, tooling holes may be made or rotated or translated to match or enable designs that entail a twist to the angle of the hinge. The holes may take into account pitch and yaw, in addition to traditional x-y-z dimensions. In this way, the hinge insertion may take 5-axes into account.

Figure 9:
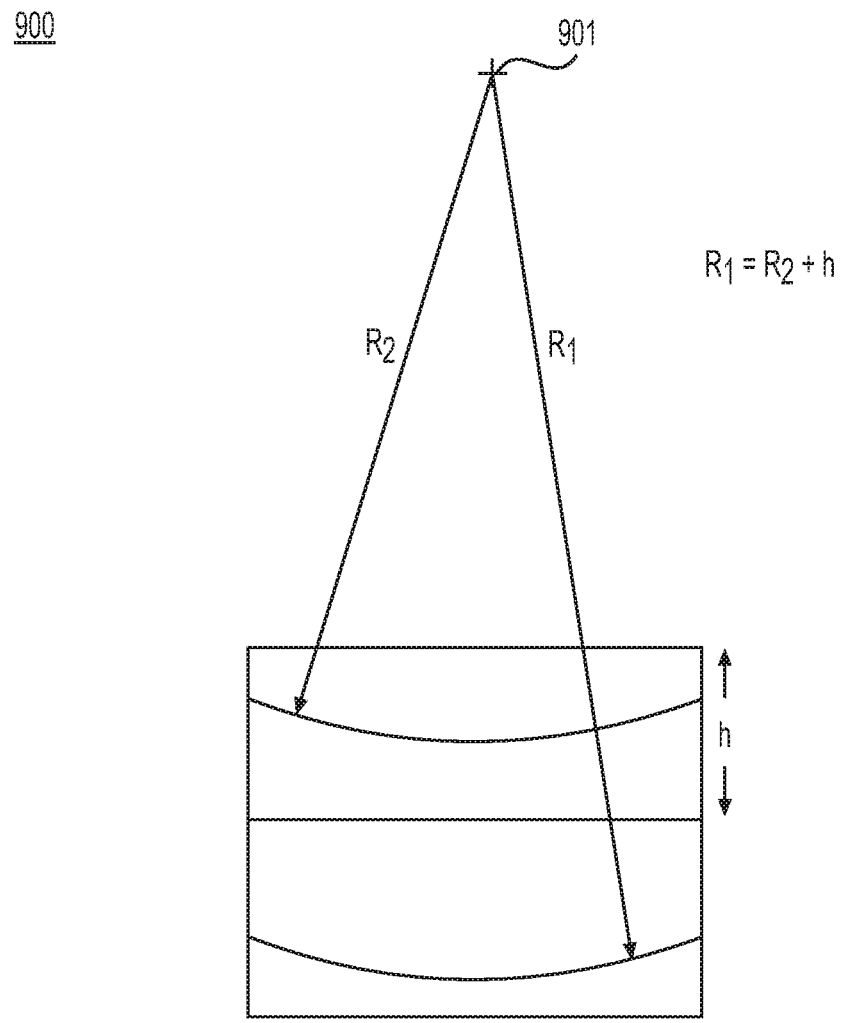
FIG. 9 depicts a cross-section of a goniometer, according to an embodiment of the present disclosure.

A goniometer may be used in combination with method 200 to enable the insertion of any inclination and splay of a hinge into a frame with little-to-no setup of an insertion machine. For example, the Z-height of an eyewear hinge may be fixed relative to the front of a frame, such that the center point of the hinge and the center point of two goniometer pairs (e.g., as shown in FIG. 9) may be stacked one on top of the other such that they line up to the same 3D point 901. In one embodiment, a goniometer pair may be used. The pair of goniometers may include two goniometers stacked on top of each other. The two stacked goniometers may have a rotation center point that is at the same location in 3D space (e.g., point 901 of FIG. 9, where the radius of curvature of the bottom goniometer may be greater than the radius of curvature of the top goniometer by the thickness of the top goniometer).

Another hinge insertion method that entails minimal setup, may entail a fixture holding a frame by programmable tooling holes. The fixture may hold the frame via the holes, such that a 3D position of a final hinge placement is set (e.g., maintained in position), regardless of the angles of either goniometer in a goniometer pair. In such a setup (e.g., FIG. 10), the tooling holes (e.g., holes 1001 of FIG. 10) may ensure the correct 3-axis positioning (X, Y, Z), and 3 axis of rotation (theta, splay, and drop angles). This embodiment may include dialing the two goniometers to pre-determined angles (e.g., by turning each goniometer's adjustment dial until both pre-determined angles are achieved, as can be seen from confirmation of a 2-axis digital or analog angle indicator). The turning of said dials can be done by hand (rotation of a knob), or digitally controlled via servo motors and digital angle feedback sensors. The angle may be specified via a drawing, an engraving on the carrier (e.g., via human readable text or a barcode), a lookup value (e.g. serial number) on the accompanying drawing or carrier, etc. For example, the lookup value may provide (e.g., via a database lookup) one or more angles to adjust a machine to, or the goniometers may be directly driven to the intended angles via one or more motorized stage(s). If the goniometer stages are not a matched pair and/or their rotation center points do not overlap, the translation in X and/or Y may be compensated for by shifting the tooling holes in the carrier. A Z-probe (measurement in Z) can account for any Z (e.g., depth) offset.

In summary, the above embodiments provide a method of machining a frame (or frame parts) that facilitates the manufacturing, traceability of the frame/part(s) and downstream processing. The machining process may include creating a seam in a coupon that may permit a complete frame or frame part to be (manually) excised from the coupon. The coupon (pre- or post-seam creation) may include a traceable feature or marking that may facilitate downstream manufacturing, processing, and hinge insertion. These embodiments present improvements to the current state of the art, which is costly and labor-intensive in its machining mechanisms, and provides no traceable features to eyewear parts to facilitate creation of a final eyewear product.

It would be apparent to one of skill in the relevant art that the present disclosure, as described herein, can be implemented in many different embodiments of software, hardware, firmware, and/or the entities illustrated in the figures. The operational behavior of embodiments may be described with the understanding that modifications and variations of the embodiments are possible, given the level of detail presented herein. It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for machining an eyewear frame, using a computer system, the method comprising:
   receiving a coupon for making the eyewear frame, wherein a structure of the eyewear frame includes a perimeter, a front portion, and a rear portion;
   cutting the coupon along the perimeter of the eyewear frame, wherein the cut extends from the rear portion of the eyewear frame to a predetermined depth towards the front portion of the eyewear frame; and
   creating a seam around the eyewear frame by further cutting the coupon from the front portion of the eyewear frame, wherein the seam extends across a length of the eyewear frame that is devoid of sharp edges, angles, or design features, and wherein the seam includes a flange formed to a thickness that provides stiffness during the cutting and enables clean removal of the eyewear frame from the coupon.

2. The method of claim 1, further comprising:
   removing the eyewear frame from the coupon by separating the flange of the seam that connects the eyewear frame and the coupon.

3. The method of claim 1, wherein cutting the coupon from the front portion of the frame, further comprises:
   cutting opposite the cut made from the rear portion of the frame to the predetermined depth from the front of the frame.

4. The method of claim 1, further comprising:
   cutting the coupon from the front portion of the frame at an offset from the perimeter of the eyewear frame to form a chamfer along the perimeter of the front portion of the frame.

5. The method of claim 4, wherein the chamfer forms a rounded surface that is a part of a radius of the eyewear frame.

6. The method of claim 1, wherein the coupon comprises a marker, and wherein the marker comprises one or more of: a serial number, a part number, a unique identifier, a bar code, a text, downstream machine settings, a hole, a feature to aid machining, or a hinge marker.

7. The method of claim 6, further comprising:
   aligning a hinge based upon determining an area of the eyewear frame in which the hinge is to be inserted;
   calculating an amount of material displaced by inserting the hinge;
   removing the calculated amount of material from the coupon to form the hole to receive the hinge; and
   inserting the hinge in the hole of the eyewear frame, wherein the insertion is further based on the hinge marker.

8. The method of claim 1, wherein the coupon is formed of plastic, buffalo horn, wood, carbon fiber, aluminum, monel, titanium, or a combination thereof.

* * * * *